United States Patent Office 2,919,264
Patented Dec. 29, 1959

2,919,264

PROCESS FOR REMOVING CATALYST RESIDUES FROM POLYOLEFINES

Albert Frese, Marl, Kreis Recklinghausen, Germany, assignor to Chemische Werke Huls Aktiengesellschaft, Marl, Germany, a corporation of Germany No Drawing. Application February 26, 1957
Serial No. 642,345

Claims priority, application Germany March 15, 1956

2 Claims. (Cl. 260—93.7)

The so-called low-pressure polyolefines obtained by the polymerization of olefines, especially ethylene, at comparatively low pressures and temperatures in the presence of polymerization catalyst which are formed from compounds of the elements of groups IV to VI of the periodic system, including thorium and uranium, with alkali metals, aluminum metal, aluminum hydride, metal-organic compounds of aluminum, magnesium, zinc and alkali metals (see Z. Angew. Chem. 67 (1955), 541 ff.), present some difficulties in their processing and application, since they regularly contain impurities consisting of compounds of the metals found in the catalysts. These compounds must be removed. To this end it has been suggested to treat the low-pressure polyolefines with anhydrous alcohols. But this method is cumbersome and requires considerable amounts of these alcohols. It was also tried to remove the impurities by treating the low-pressure polyolefines with aqueous or alcoholic solutions of acids. Strong mineral acids were used which were so strongly retained by the low-pressure polyolefines, that they could not be removed completely by prolonged washing with water. The low-pressure polyolefines purified with acids attack the processing machines, molds and tools by corrosion. If aqueous solutions of acid complex-forming organic compounds are used instead of strong mineral acids, the last mentioned disadvantages can be eliminated to a great extent, but it is still necessary to carry out cumbersome and annoying purifying operations.

The suspensions of crude low-pressure polyolefines obtained in the low-pressure polymerization of olefines contain 5 to 50%, and generally 10 to 15% of polyolefine such as polyethylene, polypropylene or the polybutylenes. These polyolefines are suspended in volatile aliphatic or cycloaliphatic hydrocarbons, such as butane, pentane, hexane, heptane, cyclohexane, alkylated cyclohexane, or natural or synthetic hydrocarbon mixtures with low to medium boiling ranges. The reaction and decomposition products of the catalyst, which are found in completely or partly solid suspended form or partly in dissolved form in these suspensions must be removed as completely as possible from these suspensions.

I have found that low-pressure polyolefines can be worked up more advantageously if the suspension of crude low-pressure polyolefines obtained in the polymerization are treated in a diluting agent with polyvalent water-soluble alcohols and the decomposition products of the catalysts are then washed out with water.

Suitable polyvalent water-soluble alcohols are diols, particularly aliphatic and cycloaliphatic diols, such as ethyleneglycol, butanediol, diethyleneglycol, ethylhexanediol and hydroxybutylcyclohexanol. Besides, alcohols of a higher valence, such as glycerine, erythrite, arabite, dulcite etc. can also be used. From 1 to 10 and preferably from 1.5 to 3 moles of the polyvalent alcohol are used per mole of the catalyst. After the addition of the polyvalent alcohol, the solution is mixed throughly, particularly if the polyvalent alcohol is difficultly soluble in the diluting agent, and then left standing, preferably under constant stirring, for a certain time, for example, 1 to 120, preferably 10 to 45 minutes, at temperatures between 20 and 80° C., and preferably between 50 and 70° C. The catalyst decomposes into products which can be removed easily with water at 0 to 50° C. It is of advantage to use water at 0 to 20° C. for the washing. At temperatures above 50° C. insoluble products might be formed by hydrolysis which can no longer be removed so easily. From the suspension of crude low-pressure polyolefine which has been decomposed by the addition of the polyvalent alcohol, the diluting agent can be removed first and the remaining crude low-pressure polyolefine then washed with water. In general, however, the decomposed suspension will be washed out repeatedly with water before the diluting agent is removed.

Particularly good results can be obtained if small amounts of a complex-forming organic acid are added to the first wash water. Examples of complex-forming organic acids are oxalic acid, lactic acid, glycolic acid, tartaric acid and citric acid, which are used in amounts of from 5 to 50 grams per liter of water.

By the decomposition with polyvalent alcohols I can obtain easily, after removal of the diluting agent, a low-pressure polyolefine with an ash content of about 0.01% which can be processed to satisfactory products. If small amounts of a complex-forming organic acid are added to the first wash-water, I can easily obtain ash contents of the low-pressure polyolefine of 0.005% and less. These are degrees of purity which were considered impossible up to now with such a low expenditure of chemicals and work.

Example 1

5000 parts by weight of ethylene are polymerized in 10,000 parts by weight of butane in the presence of 80 parts by weight of diethyl aluminum monochloride and 70 parts by weight of titanium tetrachloride at a temperature of 50° C. and a pressure of 10 atm. After the polymerization is completed, 300 parts by weight of ethylene glycol are added to the suspension of crude low-pressure polyolefine and the mixture is stirred for 30 minutes at 50° C. The suspension is then washed out four times with water at 10 to 20° C., by stirring it each time with 5000 parts by weight water for 20 minutes and separating it, after letting it settle for 10 minutes. The last wash water is not separated. Subsequently the butane is evaporated from the washed suspension and the purified low-pressure polyolefine is vacuum filtered. The resulting product is a polyethylene of a molecular weight of 90,000 with an ash content of 0.01%, which can be easily processed. The molecular weight is calculated according to the method by Prof. Ziegler (Agnew. Chem. 67 (1955), 548) from the reduced viscosity, which was determined on a 0.1% solution of the polyethylene in decahydronaphthalene at 135° C.

Example 2

300 parts by weight of diethylene glycol are added to the suspension of crude low-pressure polyethylene in butane, obtained by the polymerization of ethylene according to the instructions of Example 1. The mixture is stirred for 30 minutes at 60° C. and washed out four times with 5000 parts by weight of water of 20° C., as in Example 1. The last wash water is not separated. Subsequently the butane is evaporated and the purified polyethylene is vacuum filtered. The resulting product is a low-pressure polyethylene with a molecular weight of 90,000 and with an ash content of less than 0.02%.

Example 3

500 parts by weight of ethylene are polymerized in 1200 parts by weight of hexane in the presence of 4 parts by weight of diethyl aluminum monochloride and 5.25 parts by weight of titanium tetrachloride at temperatures of 40° C., and a pressure of about 1.5 atm. The resulting 15% suspension of crude low-pressure polyethylene in hexane is mixed with 25 parts by weight of 1.3-butanediol and stirred for 30 minutes at 20° C. Subsequently a solution of 10 parts by weight of oxalic acid in 500 parts by weight of water is added. After stirring for 20 minutes at 20° C. the mixture is left standing for 10 minutes. After separation of the aqueous phase, it is washed three times with 500 parts by weight of water each in the same manner. Then the purified polyethylene is vacuum filtered. The resulting low-pressure polyethylene has a molecular weight of 70,000 and an ash content of less than 0.01% and can be easily processed.

I claim:

1. Process for working up a crude low-pressure polyolefine selected from the group consisting of polyethylenes, polypropylenes and polybutylenes containing a polymerization catalyst prepared by the reduction of a compound of an element of the group consisting of the metals of groups IV to VI of the periodic system including thorium and uranium by reaction with a member of the group consisting of alkali metals, aluminum, aluminum hydride and metal organic compounds of aluminum, magnesium, zinc and alkali metals, which comprises mixing a suspension of the crude low-pressure polyolefine in a volatile low to medium boiling hydrocarbon with a polyvalent water soluble alcohol in the ratio from 1 to 10 moles of alcohol per mol of the catalyst at a temperature of from 20° to 80° C. and then washing the mixture with water at a temperature between 0° and 50 °C.

2. Process as defined in claim 1 in which a small amount of a complex-forming organic acid of the group consisting of oxalic acid, lactic acid, glycolic acid, tartaric acid and citric acid is added to at least the first washwater.

References Cited in the file of this patent

FOREIGN PATENTS

| | | |
|---|---|---|
| 342,107 | Great Britain | Jan. 29, 1931 |
| 533,362 | Belgium | May 16, 1955 |
| 534,888 | Belgium | Jan. 31, 1955 |